Patented July 1, 1941

2,247,523

UNITED STATES PATENT OFFICE 2,247,523

PROCESS FOR REFINING PHENOLS

Friedrich Schick, Berlin-Dahlem, and Helmut Schramm, Berlin-Lichtenrade, Germany, assignors to the firm Deutsche Erdöl-Aktiengesellschaft, Berlin-Schoeneberg, Germany No Drawing. Application April 15, 1938, Serial No. 202,218. In Germany April 27, 1937

15 Claims. (Cl. 260—627)

When separating the phenols from tar oils and the like and extracts thereof and from other materials containing phenols such as waste water and transformation products by means of alkaline solutions, neutral oils, sometimes in considerable quantities, are absorbed by said solutions along with the phenols. To remove these neutral oils several processes have been used, particularly the so called "clear-steaming" process and extracting the solution with low boiling solvents.

But these refining processes show some disadvantages, such as a considerable waste of heat and, especially when certain lignite tar creosotes are treated, insufficient refining.

It has been proposed, in the production of pure phenols from low-temperature pit-coal tar, to replace "clear-steaming" by a treatment with adsorbing agents, such as fuller's earth, Florida earth, diatomaceous earth, salts, hydroxides or vegetable carbon. But even by this process products clearly soluble in caustic soda solution, such as are required for the manufacture of artificial resins or for pharmaceutical purposes, cannot be obtained at all or only by employing large quantities of the adsorbing agents. This is especially true when lignite-tar creosotes are refined by this method.

It now has been found that a product completely soluble in alkaline hydroxide solution may be obtained by a treatment with adsorbing agents if the low boiling phenols, i. e. the creosote fraction boiling below about 220° C. is enriched in the tar oil to be decreosoted, preferably before the treatment with alkali. This may be done either by separating from the tar oil by distillation those components which have a higher boiling point, for instance above 240° C., and extracting with alkaline hydroxide solution only the distillate, or by adding low boiling phenols or oil fractions containing same previous to the treatment with the alkaline hydroxide solution or previous to the treatment with the adsorbing agent. The fractions boiling below 200° C. have proved to be particularly effective. Instead of the low boiling free phenols, if desired, also the solutions of alkali phenolates prepared therefrom by the addition of an alkaline hydroxide solution may be added. Thus the following possibilities are presented:

(a) Addition of low boiling phenols to the creosote containing oil or to the crude creosote;

(b) Addition of a solution of alkali phenolates to the creosote containing oil or to the crude creosote;

(c) Addition of phenols to the creosotic extract;

(d) Addition of alkali phenolate solution to the creosotic extract.

A great variety of substances having adsorbing properties such as fuller's earth, diatomaceous earth and active carbons, e. g. activated coke residues from wood, lignite and the like have proved to be suitable for use in the process.

The treatment of the phenolic extract with these adsorbing agents may be carried out either by stirring the finely ground powder of the adsorbent into said extract or by filtering the latter through layers of the adsorbent of sufficient height.

The quantity of the adsorbent required to obtain phenolate solutions which are clearly soluble even in the greatest dilution depends on the starting material, especially on the boiling range of the latter or on its content of low boiling phenols. Generally less than 5% of the adsorbing agent is required and with fractions boiling below 220° C., less than 2%.

The selective action of the adsorbent is often enhanced and simultaneously the quantity of adsorbent needed is lessened by operating at higher temperatures, preferably between 60° and 100° C.

Furthermore it may be of advantage to allow the crude phenolate solution to stand for some time before the adsorptive treatment. If any precipitate appears during this time, it is separated by decanting, centrifuging or the like before the adsorptive treatment.

The value of the new process is shown by the following table:

| Fraction | Boiling below 200° C. | Boiling below 220° C. | Active carbon required | Neutral oil in purified creosote | Solubility of purified creosote |
|---|---|---|---|---|---|
| ° C. | Percent | Percent | Percent | Percent | |
| 170–225 | 75 | 95 | <1.5 | 0 | Clear. |
| 180–256 | 25 | 74 | 4 | 0 | Do. |
| 212–264 | -------- | 5 | >100 | >2 | Turbid. |
| 212–264 | Addition of 25% of a pure creosote fraction with nearly the boiling range of the phenol. | | 5 | --------- | Clear. |

Whereas with a lignite-tar oil boiling between 170°–220° C. only about 1% of active carbon was required to refine the phenolate solution, with an oil boiling between 212–264° C. more than 100% was insufficient.

For instance the process may be carried out in the following manner: 1,000 kilos of a lignite taroil fraction with the boiling range 170–240° C., obtained by distillation and containing about 20% of creosote are stirred with 750 kilos of an alkaline hydroxide solution such as a 10% potassium hydroxide or a 10% caustic soda solution. After complete settling the phenolate solution is drawn off. The latter is fed to a filtering tower filled with about 30 kilos of activated lignite coke and heated by indirect steam to nearly 80–90° C. Into the thus refined phenolate solution, carbonic acid is passed in known manner until saturation. The phenols are separated and are withdrawn. By heating they are freed from water and, if desired, they are then redistilled, suitably under diminished pressure. Instead of the redistillation a fractionation may also be carried out immediately.

The described process is applicable not only to tar oils but also to crude tar acids, and to phenols already once distilled, or to phenols obtained by extraction, e. g. to the so called "Fresol," a well known product resulting from the treatment of lignite tar with alcohol, and similar products. To separate the phenols from the phenolate solution hydrochloric acid, sulphuric acid and the like or a plurality of these acids may be used instead of carbonic acid. Also an extraction of the phenols by organic solvents, such as ether, benzol or the like may be performed.

The phenols, treated in the aforesaid manner, frequently are still coloured or at least darken upon standing, especially in the light. Further, they may possess a damp, sometimes also penetrating, disagreeable smell. These disadvantages, common to the phenolic oils, to the tar acid fractions and also to the isolated phenols, especially to the higher homologues of the phenol, and above all to those phenols produced from low-temperature tars, have hitherto much impeded their general use.

It has been found that the smell and color of the phenols may be ameliorated to such a degree that final products are obtained which are really free from any objections, by adding a small quantity of formaldehyde or of substances developing it, and by subsequently distilling the liquid, preferably under vacuum below 100 millimeters of mercury. Generally 1% of formaldehyde is sufficient; very often still less, for instance 0.3 to 0.6% is sufficient. By this method a light, limpid product with an unobjectionable odor is obtained. By such a treatment the solubility of the phenols and phenol fractions in alkaline hydroxide solution is by no means adversely affected but rather improved. If a single treatment is not sufficient to completely remove the odor and color, it may be repeated.

Previous attempts have been made to remove odor and color by repeated distillation for instance over iron-shavings, or by blowing with air or steam, or by the so called "deodorizing by means of smoke." But such treatments require much time. For the higher boiling phenols a permanent improvement of the color cannot be obtained at all by such treatments.

Furthermore it has been proposed to heat the phenols or oils for a protracted time with an acid or an alkali and with formaldehyde, then to distil off the mixture with steam and to redistil the separated phenols under normal pressure.

But such a treatment involves great losses because under the operating conditions formaldehyde reacts with phenol as readily as with the impurities. Furthermore the resulting products always have a reddish tinge and some undesired odor; especially the characteristic odor of formaldehyde is very persistent.

The described process is distinguished from the known methods referred to by its quick and lasting effect and by its great simplicity, and it is furthermore superior to the processes hitherto known by the savings of chemicals, steam and so on. Above all, it makes possible the production of highly valuable products for pharmaceutical and other purposes even from the higher boiling creosote fractions, especially those with a boiling range between 220° and 240° C., which are specifically antiseptic but were of limited marketability heretofore due to their objectionable odor.

The effect of the treatment with formaldehyde, improving both color and odor, is not subject to previous refining of the phenols, dissolved in the alkaline hydroxide solution, by adsorbing means, though by proceeding in this order a particularly favorable effect is obtained with the smallest waste of material. It is also possible to treat the starting material, i. e. tar oils, tar oil fractions, phenol fractions, crude tar acids, phenolic extracts and the like, and in this case a remarkable improvement of the properties, particularly of color and odor, is attained.

It is always advantageous, especially as to the consumption of formaldehyde, to start from phenols or oils already once distilled or fractionated. For instance, the treatment with formaldehyde may be performed subsequently to the enrichment described above of the low boiling fractions by distillation.

Having now particularly described and ascertained the nature of our said invention, we declare that what we claim is:

1. A process for refining phenols especially from oils, extracts and tarry liquors of lignite tar, from crude tar acids, and fractions thereof, which comprises first enriching the content of low boiling phenol fractions in the starting material, then extracting said material with an alkali metal hydroxide solution, hereafter treating the phenolate solution thus obtained with adsorbing means, and finally setting free the phenols from the remaining phenolate solution.

2. A process for refining phenols especially from oils, extracts and tarry liquors of lignite tar, from crude tar acids, and fractions thereof, which comprises first enriching the content of low boiling phenol fractions in the starting material, then extracting said material with an alkali metal hydroxide solution, hereafter treating the phenolate solution thus obtained with adsorbing means, and finally setting free the phenols from the remaining phenolate solution by acidifying it.

3. A process for refining phenols especially from oils, extracts and tarry liquors of lignite tar, from crude tar acids, and fractions thereof, which comprises first enriching the content of low boiling phenol fractions in the starting material, then extracting said material with an alkali metal hydroxide solution, hereafter treating the phenolate solution thus obtained with adsorbing means, and finally setting free the phenols from the remaining phenolate solution by extraction with solvents.

4. A process for refining phenols especially from oils, extracts and tarry liquors of lignite tar, from crude tar acids, and fractions thereof, which comprises first enriching the content of low boiling phenol fractions in the starting material, then extracting said material with an alkali metal hydroxide solution, hereafter treating the phenolate solution thus obtained with active carbon, and finally setting free the phenols from the remaining phenolate solution and distilling them.

5. A process according to claim 1, wherein said enriching of the content of low boiling fractions in the starting material is achieved by distillation of the starting material.

6. A process for refining phenols especially from oils, extracts and tarry liquors of lignite tar, from crude tar acids, and fractions thereof, which comprises first adding low boiling phenols to the starting material, then extracting said material with an alkali metal hydroxide solution, hereafter treating the phenolate solution thus obtained with adsorbing means, and finally setting free the phenols from the remaining phenolate solution.

7. A process for refining phenols especially from oils, extracts and tarry liquors of lignite tar, from crude tar acids, and fractions thereof, which comprises extracting the starting material with an alkali metal hydroxide solution, adding a low boiling creosote to the phenolate solution thus obtained, treating the obtained mixture with an adsorbent, and setting free the phenols from the remaining liquid.

8. A process for refining phenols especially from oils, extracts and tarry liquors of lignite tar, from crude tar acids, and fractions thereof, which comprises extracting the starting material with an alkali metal hydroxide solution, adding a solution of a low boiling creosote in alkali metal hydroxide solution to the previously obtained phenolate solution, treating the obtained mixed phenolate solution with an adsorbent, and setting free the phenols from the remaining phenolate solution.

9. A process for refining phenols especially from oils, extracts and tarry liquors of lignite tar, from crude tar acids, and fractions thereof, which comprises first enriching the content of low boiling phenol fractions in the starting material, then extracting said material with an alkali metal hydroxide solution, allowing the obtained crude phenolate solution to stand for some time, separating any precipitates formed thereby, hereafter treating the phenolate solution thus obtained with adsorbing means, and finally setting free the phenols from the remaining phenolate solution.

10. A process for refining phenols especially from oils, extracts and tarry liquors of lignite tar, from crude tar acids, and fractions thereof, which comprises first enriching the content of low boiling phenol fractions in the starting material, then extracting said material with an alkali metal hydroxide solution, hereafter treating the phenolate solution thus obtained with adsorbing means at an elevated temperature not greatly exceeding 100° C., and finally setting free the phenols from the remaining phenolate solution.

11. A process for refining phenols especially from oils, extracts and tarry liquors of lignite tar, from crude tar acids, and fractions thereof, which comprises enriching the content of low boiling phenol fractions in the starting material, then extracting said material with an alkali metal hydroxide solution, treating the formed phenolate solution with adsorbing means, setting free the phenols from the remaining phenolate solution, adding small quantities of formaldehyde to said phenols set free, and finally distilling said phenols.

12. A process for refining phenols especially from oils, extracts and tarry liquors of lignite tar, from crude tar acids, and fractions thereof, which comprises treating the starting material with small quantities of formaldehyde, then distilling said material in such a manner that the low boiling fractions of phenols are enriched therein, extracting the obtained distillate with an alkali metal hydroxide solution, treating the formed phenolate solution with adsorbing means, setting free the phenols from the remaining phenolate solution.

13. A process for refining phenols especially from oils, extracts and tarry liquors of lignite tar, from crude tar acids, and fractions thereof, which comprises enriching the content of low boiling phenol fractions in the starting material by distillation, treating the starting material with small quantities of formaldehyde, then distilling said material again, extracting the obtained distillate with an alkali metal hydroxide solution, treating the formed phenolate solution with adsorbing means, setting free the phenols from the remaining phenolate solution.

14. A process for refining phenols especially from oils, extracts and tarry liquors of lignite tar, from crude tar acids, and fractions thereof, which comprises first enriching the content of low boiling phenol fractions in the starting material, then extracting said material with an alkali metal hydroxide solution, hereafter treating the phenolate solution thus obtained with an activated coke residue, and finally setting free the phenols from the remaining phenolate solution and distilling them.

15. A process for refining phenols especially from oils, extracts and tarry liquors of lignite tars, from crude tar acids, and fractions thereof, which comprises extracting said material with an alkali metal hydroxide solution, then enriching the content of low boiling phenol fractions in the phenolate solution thus obtained, treating the formed phenolate solution with adsorbing means, setting free the phenols from the remaining phenolate solution, adding small quantities of formaldehyde to said phenols set free, and finally distilling said phenols.

FRIEDRICH SCHICK.
HELMUT SCHRAMM.